United States Patent
Mooneyham

(10) Patent No.: US 8,166,132 B1
(45) Date of Patent: Apr. 24, 2012

(54) SYSTEMS AND METHODS FOR CLIENT-SIDE ENCODING OF USER-GENERATED CONTENT

(75) Inventor: Mark Randall Mooneyham, Folsom, CA (US)

(73) Assignee: Adobe Systems Incorporated, San Jose, CA (US)

( * ) Notice: Subject to any disclaimer, the term of this patent is extended or adjusted under 35 U.S.C. 154(b) by 217 days.

(21) Appl. No.: 12/371,722

(22) Filed: Feb. 16, 2009

(51) Int. Cl.
*G06F 15/16* (2006.01)

(52) U.S. Cl. ........................................ 709/217; 709/203

(58) Field of Classification Search .................. 709/217, 709/203
See application file for complete search history.

(56) References Cited

U.S. PATENT DOCUMENTS

| | | | |
|---|---|---|---|
| 7,069,310 B1 | 6/2006 | Bartholomew | |
| 7,159,233 B2 * | 1/2007 | Son et al. | 725/86 |
| 7,562,300 B1 * | 7/2009 | Tobias et al. | 715/727 |
| 7,765,192 B2 * | 7/2010 | Svendsen | 707/653 |
| 7,765,482 B2 * | 7/2010 | Wood et al. | 715/744 |
| 7,769,819 B2 * | 8/2010 | Lerman et al. | 709/217 |
| 7,844,548 B2 * | 11/2010 | Robbin et al. | 705/51 |
| 7,962,634 B2 * | 6/2011 | Cortos et al. | 709/229 |
| 7,987,492 B2 * | 7/2011 | Liwerant et al. | 725/115 |
| 2004/0128697 A1 * | 7/2004 | Wood et al. | 725/115 |
| 2008/0256583 A1 * | 10/2008 | Liwerant et al. | 725/112 |

* cited by examiner

*Primary Examiner* — Kevin Bates
(74) *Attorney, Agent, or Firm* — Kilpatrick Townsend & Stockton LLP

(57) ABSTRACT

Methods and systems are disclosed that facilitate client-side encoding of content. Certain embodiments involve sending a user's client device items for encoding content that will be uploaded to an upload recipient. In some cases, a client-device may receive an encoding application or application component for performing the encoding. In some cases, a client device may receive upload parameter information for the upload. The embedded content may include an identifier that allows confirmation that it was encoded according to the parameters. Embodiments provide various mechanisms for an upload recipient to guarantee or otherwise trust that uploaded content has been appropriately encoded and/or encrypted by a user. Items and instructions for uploading can be provided from the upload recipient or from a provider who is trusted by the client and the recipient with respect to encoding the content.

20 Claims, 9 Drawing Sheets

SYSTEMS AND METHODS FOR CLIENT-SIDE ENCODING OF USER-GENERATED CONTENT

FIELD

Embodiments relate generally to the field of computing and specifically to computing applications used to create, manage, store, and distribute applications and other computer content.

BACKGROUND

Social media web sites and other content distributors receive a large volume of uploaded content, including audio and video content. Typically, a user on a remote client device uploads a file in a given encoded format to the site. This uploaded file may be in a variety of formats and significantly vary from other uploaded files with respect to encoding quality. Once received, the site's server or server farm decodes and then re-encodes the content in one or more of the formats used by the site. This can be a very computationally expensive process, particularly in situations involving newer codecs. However, in the past, the process has generally been required in many cases because the site otherwise lacks an effective and efficient means of ensuring that content coming from a user's client device has been properly encoded using the site's own encoding parameters. Thus, lacking an acceptable, efficient alternative, many sites and other content distributors choose to receive files and do the computationally-intensive, decode/re-encode process on their own servers. The decode/re-encode process can also sacrifice or otherwise reduce content quality.

SUMMARY

Methods and systems are disclosed that facilitate client-side encoding of content. Certain embodiments involve sending a user's client device items for encoding content that will be uploaded to an upload recipient. In some cases, a client-device may receive an encoding application or application component for performing the encoding. In some cases, a client device may receive upload parameter information for the upload. The embedded content may include an identifier that allows confirmation that it was encoded according to the parameters. Embodiments provide various mechanisms for an upload recipient to guarantee or otherwise trust that uploaded content has been appropriately encoded and/or encrypted by a user. Items and instructions for uploading can be provided from the upload recipient or from a provider who is trusted by the client and the recipient with respect to encoding the content.

One embodiment provides a method of uploading content encoded according to a recipient's requirements. The exemplary method involves sending a request to upload content to a recipient and receiving instructions for encoding the content according to encoding requirements of the recipient. The method further involves encoding the content to create encoded content in accordance with the instructions for encoding the content. The encoded content provides an indication that the content was encoded in accordance with the instructions for encoding the content. For example, the encoded content may include an embedded, hashed, or otherwise included identifier that indicates proper encoding. Finally, this exemplary method involves uploading the encoded content to the recipient.

Another exemplary embodiment comprises a method of providing a profile and instructions for obtaining the profile to a party requesting to upload content. The method comprises providing a profile to a provider for distribution to a computer device that has requested to upload content. The method further comprises providing instructions to the computer device to retrieve the profile from the provider and use the profile to encode the content to create encoded content. The method also comprises receiving an upload of the encoded content from the computer device and determining whether the encoded content was encoded according to the profile.

In other embodiments, a computer-readable medium (such as, for example, random access memory or a computer disk) comprises code for carrying out the methods and systems described herein.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the certain embodiments are better understood when the following Detailed Description is read with reference to the accompanying drawings, wherein.

DETAILED DESCRIPTION

Certain embodiments facilitate client-side encoding. Certain embodiments involve sending a client-device instructions for how to encode and an identifier that can be used to confirm that an uploaded piece of content was encoded according to the instructions. The instructions may take the form of a plug-in to a media consumption or other computer application and may include parameters or format information. For example, a plug-in may enable general encoding according to the h.264 video compression standard and one or more parameters can be provided for encoding according to the recipient's requirements.

For example, in one embodiment when a user requests to upload a video, if not already installed, an encoding plug-in is downloaded and installed on the user's client device. A server sends encrypted encoding instructions, including an identifier, to the user's client device and the client device encodes the video locally according to the encoding instructions, and includes the identifier in the output video. The video is then uploaded to a recipient's server. This server checks for the existence of the identifier as a means of validating that the video was encoded according to the specified instructions, and therefore is ready for deployment without further transcoding or other measures by the server.

These illustrative examples are given to introduce the reader to the general subject matter discussed herein. The disclosure is not limited to these examples. The following sections describe various additional embodiments and examples of methods and systems for facilitating client side encoding of content.

Illustrative Environments

Figure 1:
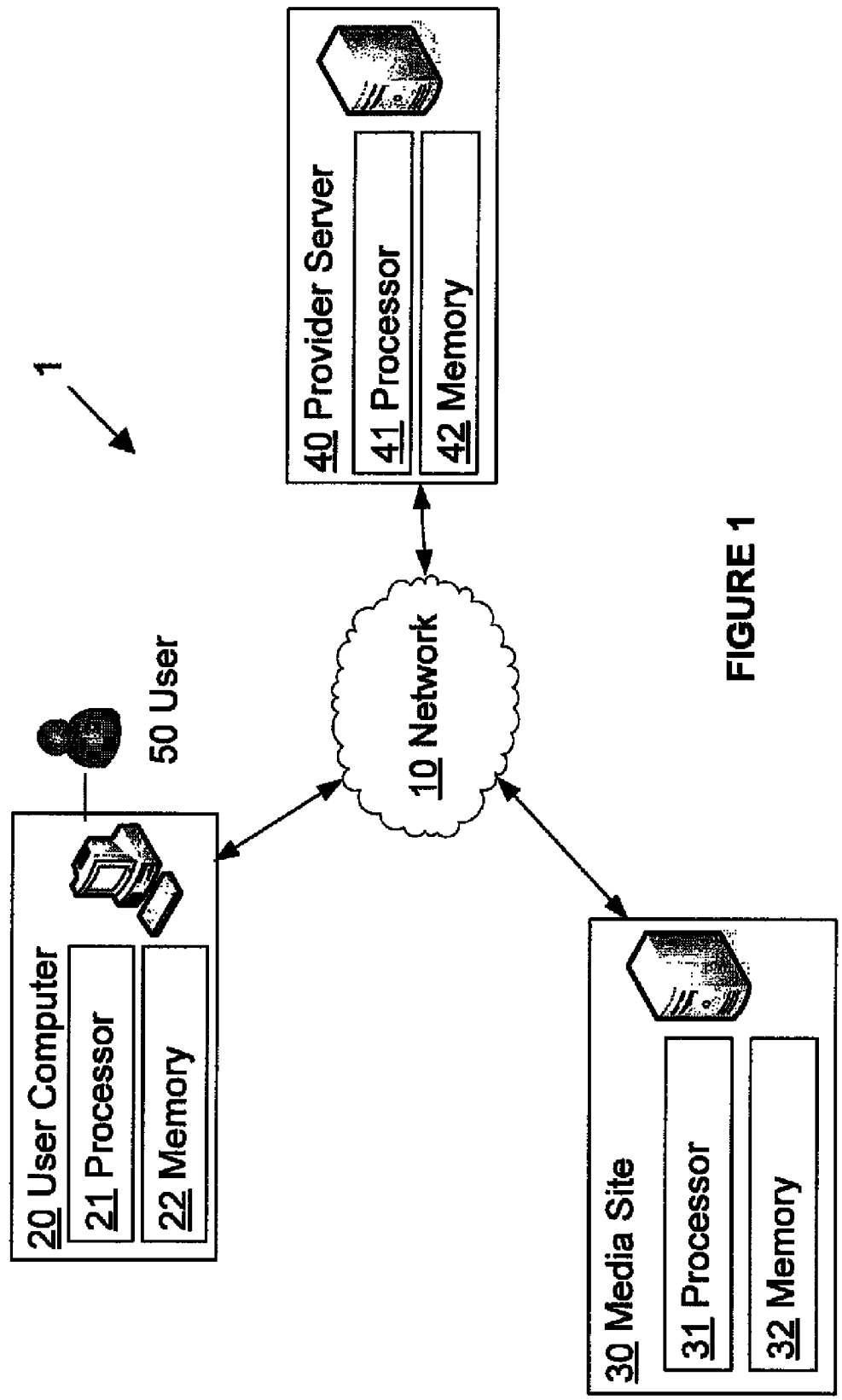
FIG. 1 is a system diagram illustrating an computing systems in which content can be created on a user computer and shared through a media site, according to certain embodiments.

Referring now to the drawings in which like numerals indicate like elements throughout the several figures, FIG. 1 is a system diagram illustrating an computing systems 1 in which content can be created on a user computer 20 and shared through a media site 30. A provider server 40 provides various pieces of information that facilitates encoding and/or encrypting of a piece of content on the user computer prior to the user's computer sending the content to the media site 30 for distribution to others. The computing system 1 shown in FIG. 1 comprises various exemplary computing devices 20, 30, 40, each of which may comprise a processor 21, 31, 41 and a memory 22, 32, 42, and other computer peripheral devices and software as is known in the art.

Computing system 1 is provided as an example to facilitate explanation of certain features of certain embodiments. Other embodiments may utilize various alternative computing systems, including systems involving many user computers, media sites, recipients, and provider servers. In addition, none of the represented components should be considered essential to any embodiment or feature discussed herein.

Figure 2:
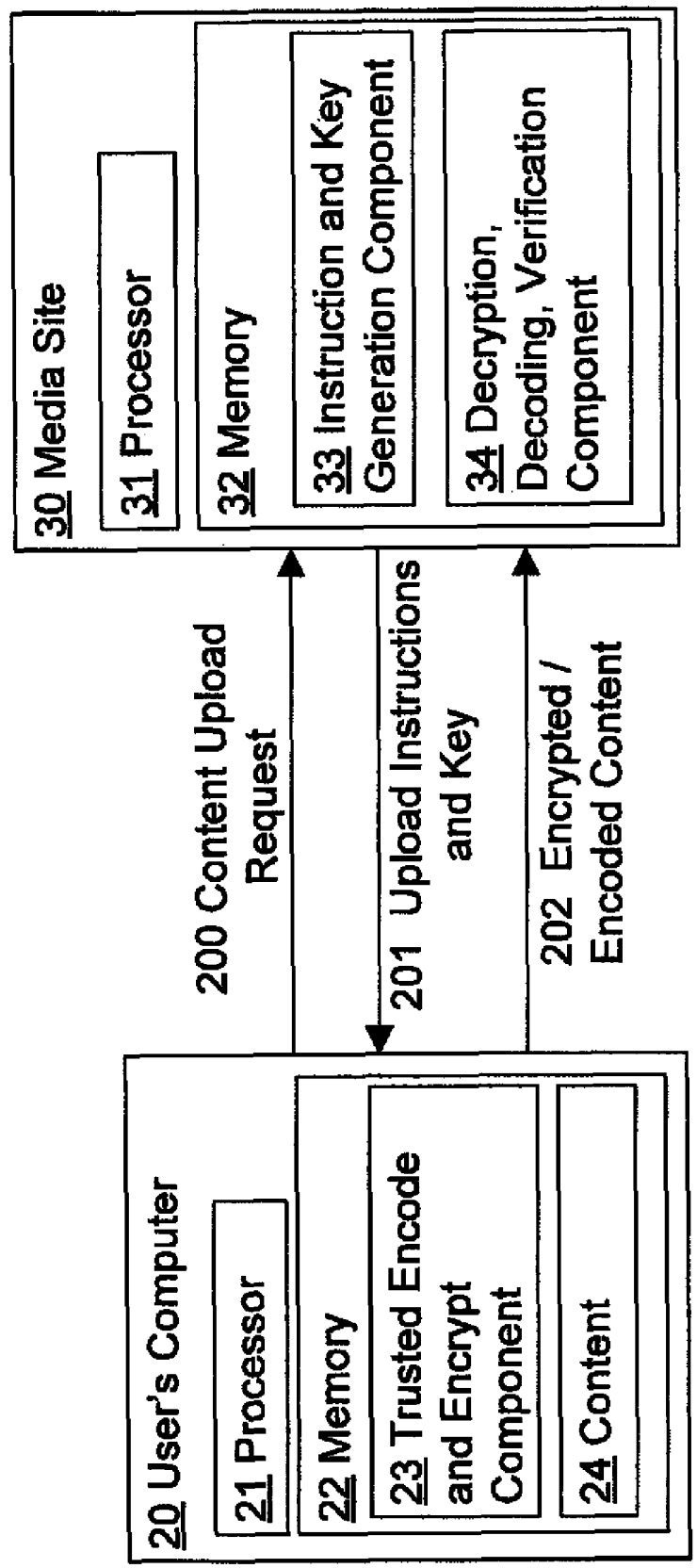
FIG. 2 is a flow chart illustrating exemplary communications resulting in a user computer sending content to a media site, according to certain embodiments.

FIG. 2 is a flow chart illustrating exemplary communications resulting in a user computer 20 sending content to a media site 30. A user initiates this process by sending a content upload request 200 to a media site 30 requesting, for example, that a video or other content 24 be uploaded to the media site for access by other users of the media site. In response, an instruction and key generation component 33 of the media site 30 sends upload instructions and a key 201 back to the user's computer 20. These upload instructions specify the particular software component or application that can be used to encode and/or encrypt the content to be uploaded. For example, the upload instructions may specify that only a particular vendor's encoding component can be used. In addition, the upload instructions may further specify the format of the upload, such as, for example, the compression/encoding standard that will be used. The upload instructions may also specify various encoding parameters. Exemplary instructions account for the media site's particular preferences and requirements. Exemplary instructions may specify an FTP server, IP address, login information, port information, time, day, format, whether download will be all at once or in pieces, and whether communication is peer to peer, etc., among many other things. Instructions may provide credentials of many types including, but not limited to, password, IP address verification, token verification, etc.

The upload instructions and key 201 communication generally provides information that can be used by the trusted encode and encrypt component 23 to encode the content 24, encrypt (or otherwise package) the content 24 using the key, and upload the content 24 to the media site 30. Thus, the properly encrypted/encoded content 202 is sent from the user's computer 20 to the media site. The use of various aspects of an upload instructions and key 201 communication can allow the media site 30 to verify that the content 24 was properly encoded according to the instructions and/or that the content 24 is from the user who initiated the upload and has not been tampered with. Thus the media site may include a decryption, decoding, and verification component 34 that performs these functions on each piece of encrypted/encoded content 202 received at the media site 30. Various alternatives are of course possible. For example, certain embodiments will not send the key with the instructions and certain embodiments will not use a key or encryption.

Figure 3:
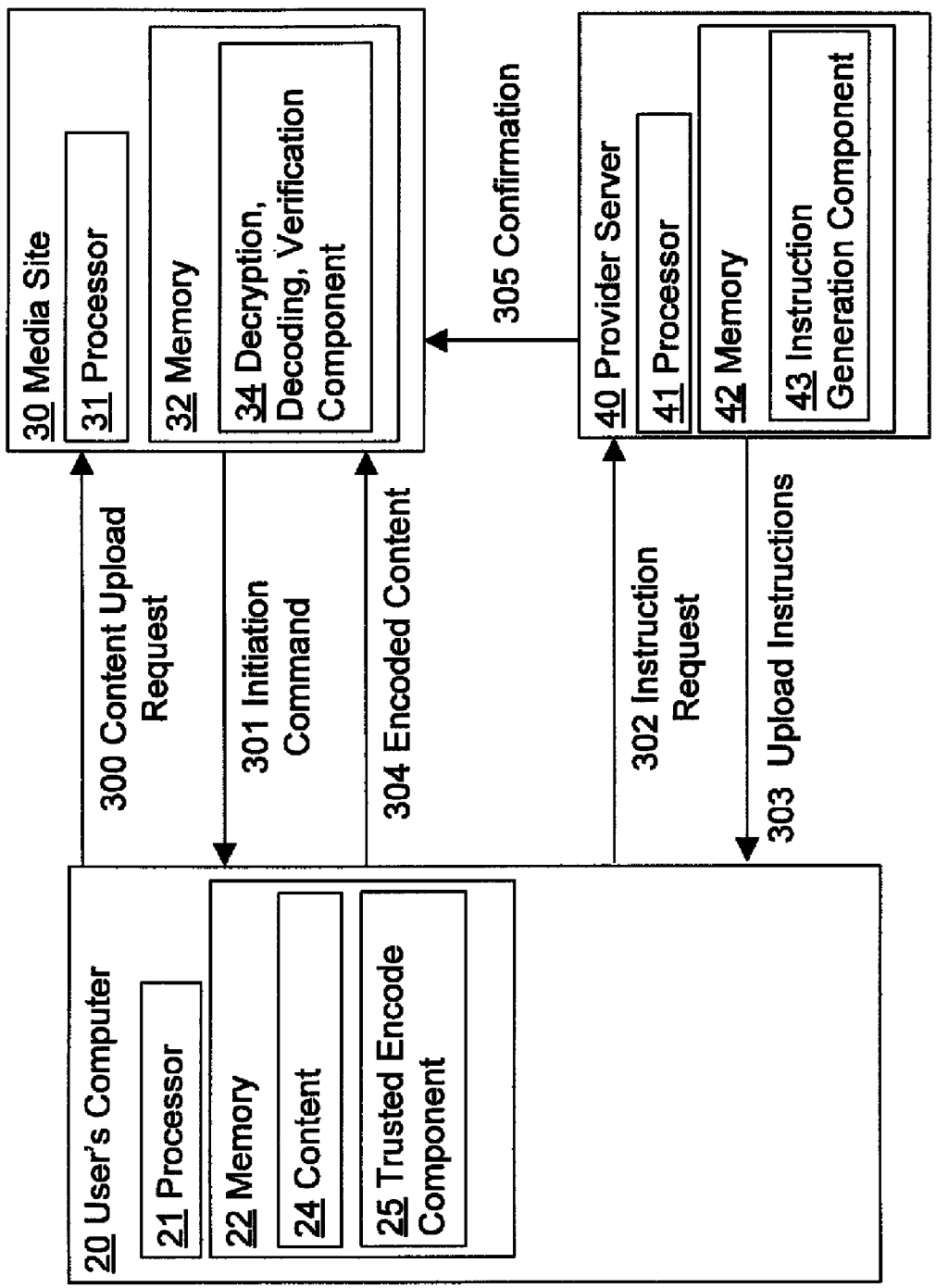
FIG. 3 is a flow chart illustrating exemplary communications resulting in a user computer sending content to a media site according to instructions from a provider server, according to certain embodiments.

FIG. 3 is a flow chart illustrating exemplary communications resulting in a user computer 20 sending content to a media site 30 according to instructions from a provider server 40. A user initiates this process by sending a content upload request 300 to the media site 30 requesting, for example, that content 24 be uploaded to the media site. In response, the media site 30 sends an initiation command 301 back to the user's computer 20. This initiation command causes a trusted encode component 25 to request instructions from a provider server 40 by, for example, sending instruction request 302. In response, an instruction generation component 43 of provider server 40 sends upload instructions 303 back to the user's computer 20. These upload instructions 303 may specify the format of the upload, such as, for example, the compression/encoding standard that will be used. The upload instructions 303 may also specify various encoding parameters.

The trusted encode component 25 can use the upload instructions 303 to encode and then upload the encoded content 304 to the media site. In addition, the provider server and media site may communicate to confirm, verify, or otherwise track the information provided to the user's computer. For example, the provider server 40 may send a confirmation 305 to the media site 30 indicating that upload instructions have been provided to the user's computer for a given, requested upload transaction.

As another example, media site 30 and provider server 40 may communicate with one another to ensure that the upload instructions 303 sent out reflect the media site's current parameters and preferences for uploaded content. In certain embodiments, provider server 40 will verify that the user's computer and/or the particular upload transaction is authorized by the media site to receive upload instructions.

Figure 4:
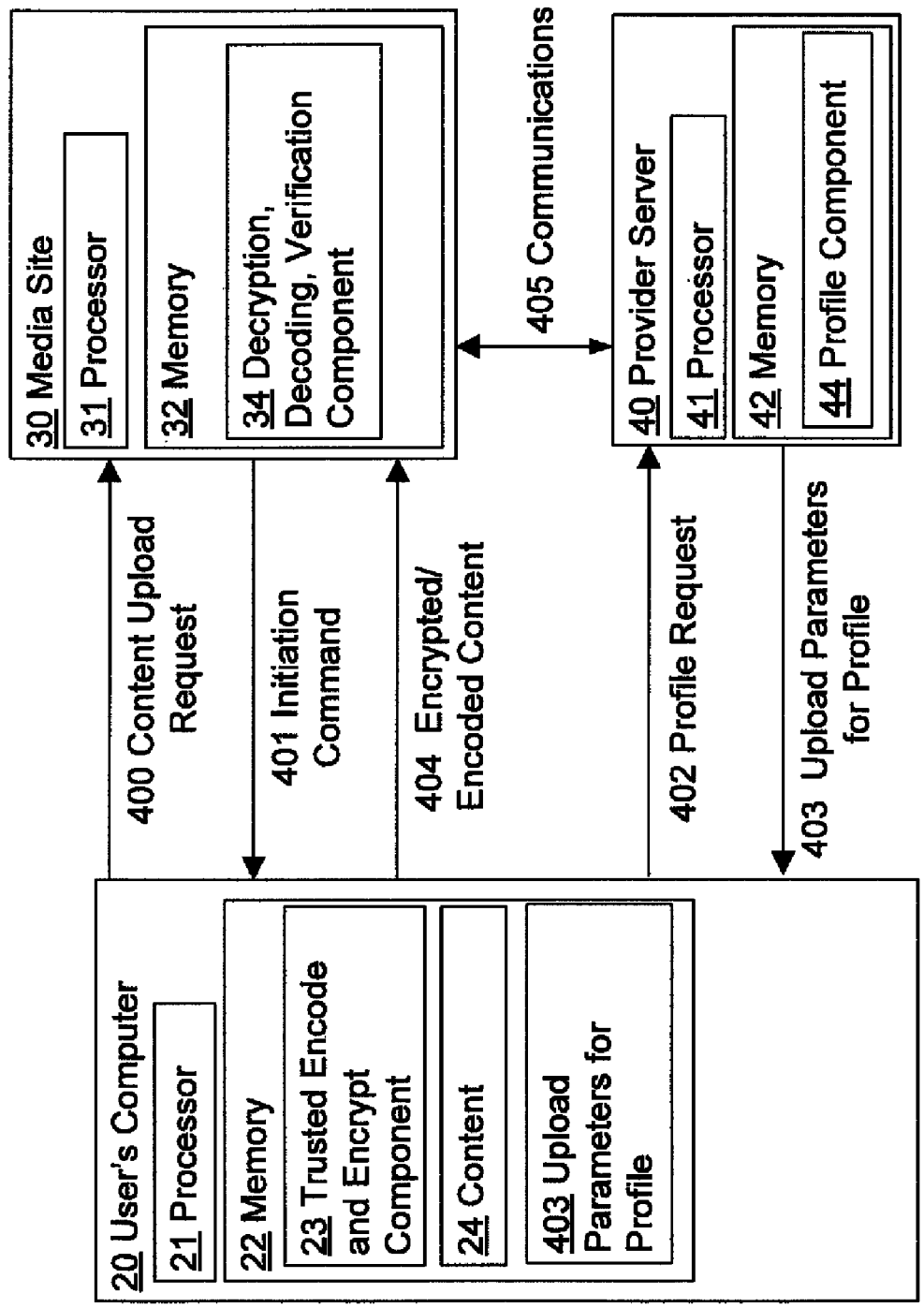
FIG. 4 is a flow chart illustrating exemplary communications resulting in a user computer sending content to a media site according to a media site profile provided from a provider server, according to certain embodiments.

FIG. 4 is a flow chart illustrating exemplary communications resulting in a user computer 20 sending content to a media site 30 according to an upload profile provided from a provider server 40. In this example, a user initiates this process by sending a content upload request 400 to the media site 30 requesting, for example, that content 24 be uploaded to the media site. In response, the media site 30 sends an initiation command 401 back to the user's computer 20. This initiation command causes a trusted encode and encrypt component 23 to request an upload profile from a provider server 40 by, for example, sending a profile request 402. The initiation command 401 may identify a particular upload profile to be requested, may identify the transaction, and/or may identify the media site.

A profile component 44 of provider server 40 receives the profile request 402 and identifies an appropriate profile. For example, the profile request 402 may identify a specific profile. As another example, if the profile request identifies the media site 30, an appropriate profile may automatically be identified. As another alternative, the profile component may use an identification of the media site and/or the particular upload transaction in combination with communication with the media site 30 to identify an appropriate upload profile. For example, the provider server 40 may send and receive communications 405 asking the media site 30 which profile should be used with an identified upload transaction.

After identifying an appropriate upload profile, the provider server 40 sends the upload parameters for the profile 403 to the user's computer 20. These upload parameters for the profile 403 may, for example, specify a particular combination of upload format and parameters, accounting for the media site's particular preferences and requirements. The trusted encode and encrypt component 23 uses these upload parameters to encode and/or encrypt content 404 that is sent to the media site for decryption, decoding, and verification by verification component 34. The upload parameters for the profile 403 may be stored on the user's computer for use in future uploading to the media site 30. So that, for example, when the user's computer next requests an upload, the profile request need not be again retrieved from the provider server 40. In such cases, the initiation command 401 may provide an indication of the current version of a upload profile required for the upload transaction.

Figure 5:
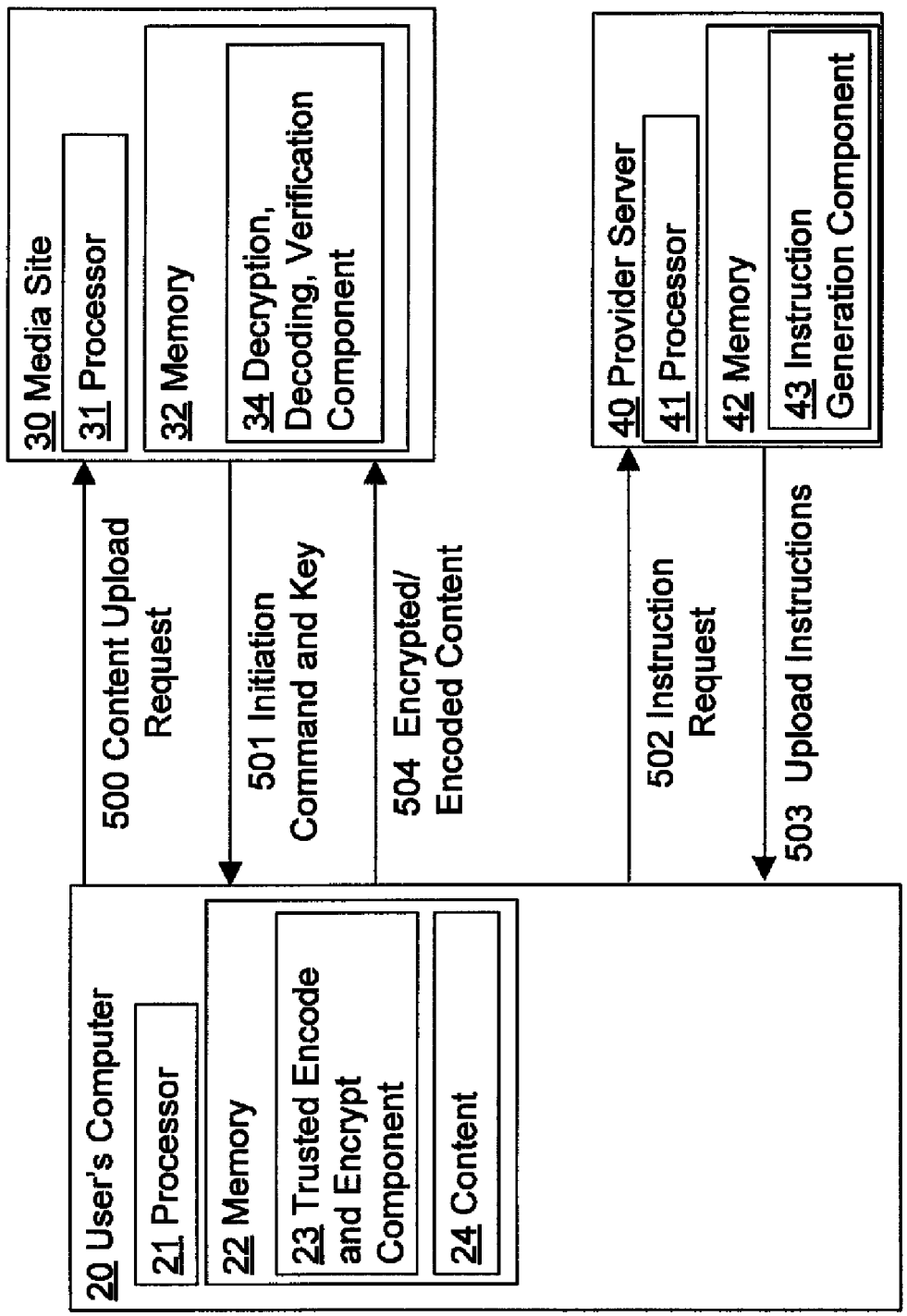
FIG. 5 is a flow chart illustrating exemplary communications resulting in a user computer sending encrypted content to a media site according to instructions provided from a provider server, according to certain embodiments.

FIG. 5 is a flow chart illustrating exemplary communications resulting in a user computer 20 sending encrypted content to a media site 30 according to instructions provided from a provider server 40. In this example, a user initiates this process by sending a content upload request 500 to the media site 30 requesting, for example, that content 24 be uploaded to the media site 30. In response, an application at the media site 30 sends an initiation command and key 501 back to the user's computer 20. In a similar manner as that described with respect to previous examples, the initiation command causes the sending of an instruction request 502 resulting in the receiving of upload instructions 503 from provider server 40.

The trusted encode and encrypt component 23 then encodes the content 24 according to the upload instructions 503 and encrypts the encoded result using the key into encrypted/encoded content 504 that is sent to the media site 30. The decryption, decoding, verification component 34 of the media site 30 can then use the key to decrypt the encrypted/encoded content 24 and make available or otherwise use the properly encoded content.

Figure 6:
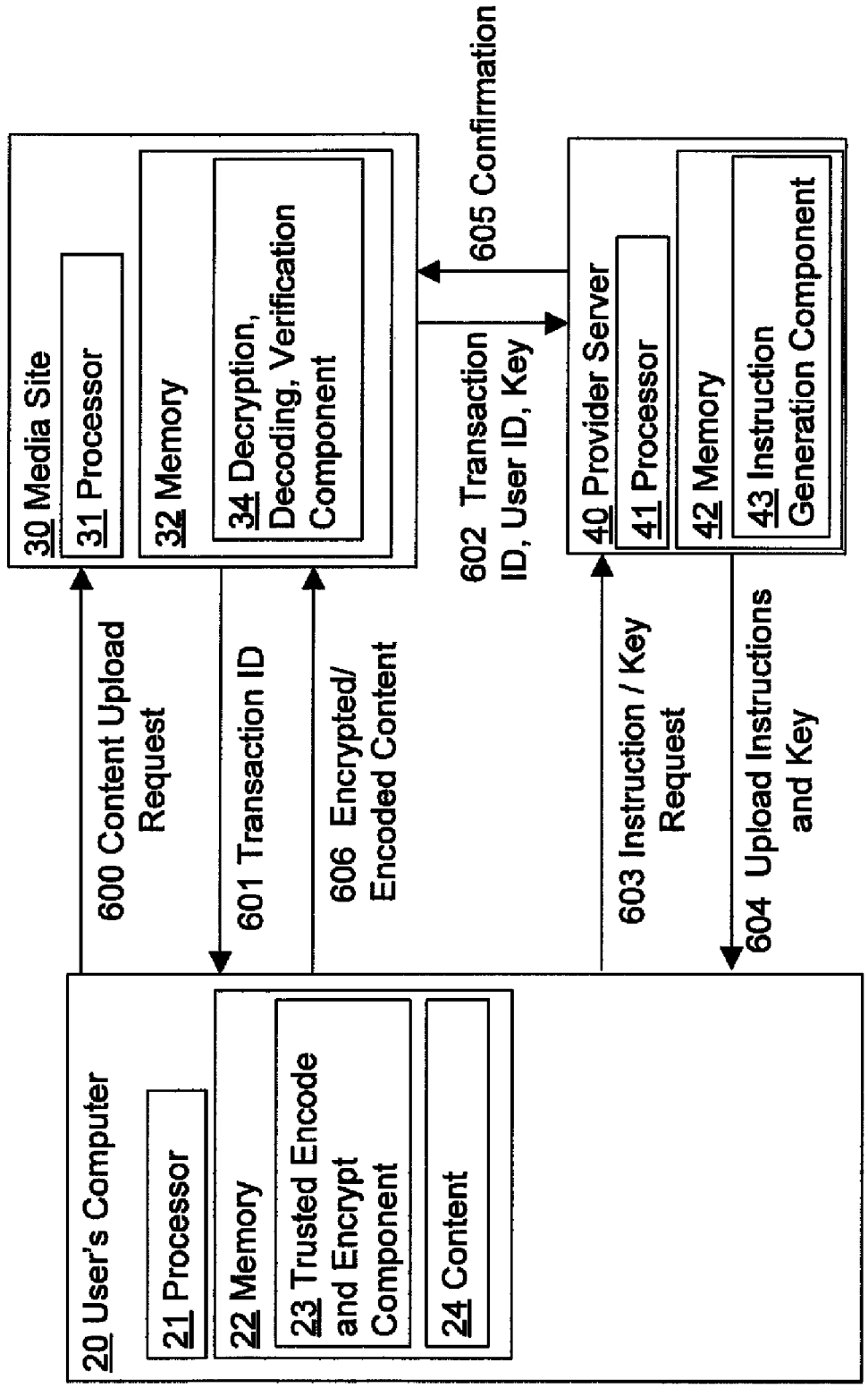
FIG. 6 is a flow chart illustrating exemplary communications resulting in a user computer sending encrypted content to a media site according to instructions and a key provided from a provider server, according to certain embodiments.

FIG. 6 is a flow chart illustrating exemplary communications resulting in a user computer 20 sending encrypted content to a media site 30 according to instructions and a key provided from a provider server 40. In this example, a user initiates this process by sending a content upload request 600 to the media site 30 requesting, for example, that content 24 be uploaded to the media site 30. In response, the media site 30 sends a transaction ID 601 back to the user's computer 20. In one embodiment, the media site 30 also sends communication 602 with the transaction ID, the user ID of the user requesting the upload, and the key that should be provided. At the user's computer, the transaction ID 601 is used by a trusted encode and encrypt component 23 to send an instruction/key request 603 to a provider server 40. Certain embodiments involve including the transaction ID 601 in the instruction/key request 603.

Upon receiving the instruction/key request 603, an instruction generation component 43 of the provider server 40 uses the received transaction ID 601 or other means to identify an appropriate key from the communication 602 received from the media site 30. The instruction generation component 43 may also identify appropriate instructions for the upload based on the media site identity, the user identity, instruction from the media site, and/or instruction from the user. The upload instructions and key 604 are sent to the user's computer 20. A confirmation 605 may be sent to the media site confirming that the key and instructions were provided to the user for the transaction. At the user's computer, the received upload instructions and key 604 are used to encode, encrypt, and upload the encrypted/encoded content 606 to the media site 30.

Figure 7:
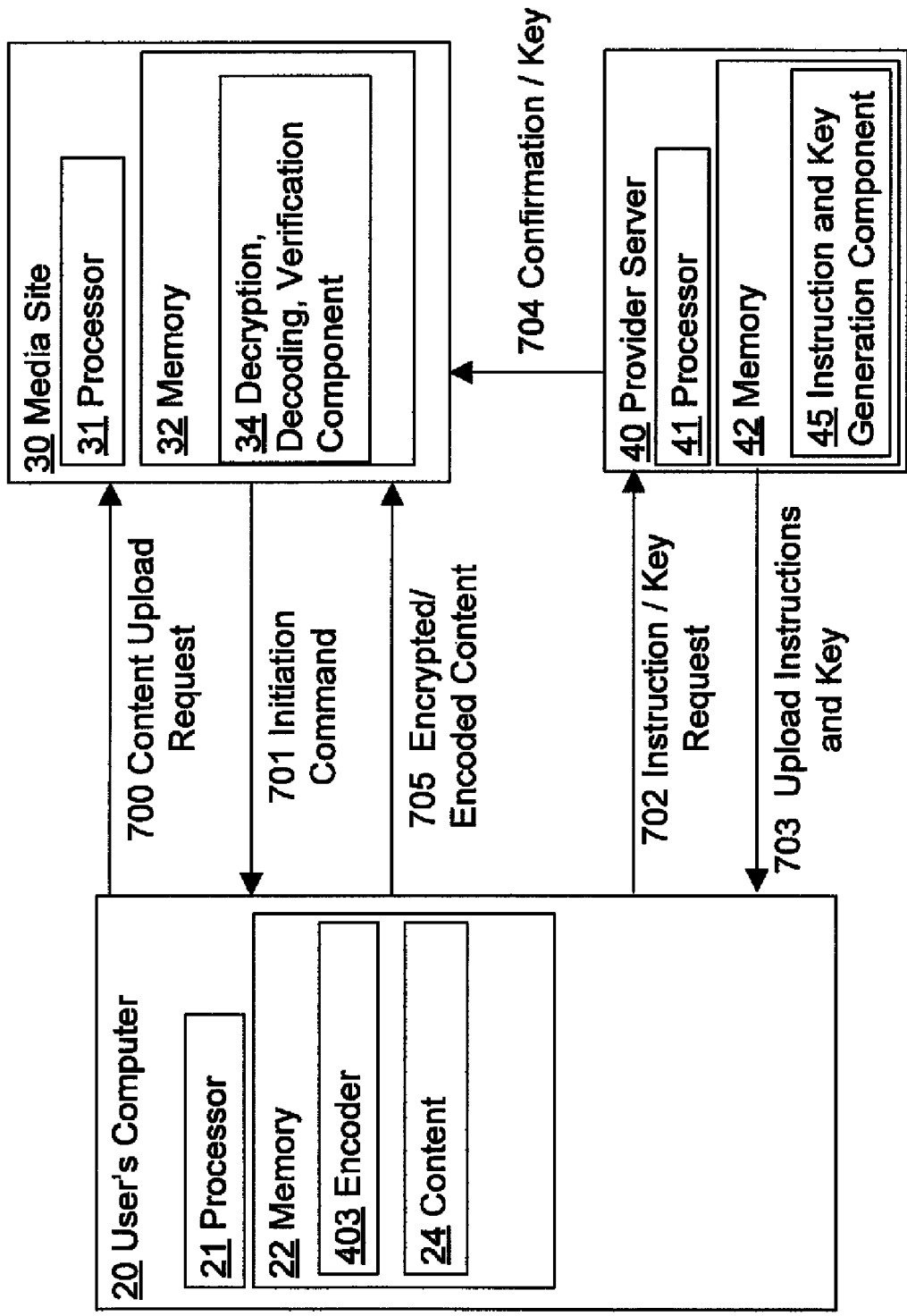
FIG. 7 is a flow chart illustrating exemplary communications resulting in a user computer sending encrypted content to a media site according to instructions and a key provided from a provider server, according to certain embodiments.

FIG. 7 is a flow chart illustrating exemplary communications resulting in a user computer 20 sending encrypted content to a media site 30 according to instructions and a key provided from a provider server 40. In this example, a user initiates this process by sending a content upload request 700 to the media site 30. In response, the media site 30 sends an initiation command 701 back to the user's computer 20. In response to the initiation command 701, the trusted encode and encrypt component 23 sends an instruction/key request 702 to a provider server 40.

Upon receiving the instruction/key request 702, an instruction and key generation component 45 of the provider server 40 generates an appropriate key and/or identifies appropriate upload instructions. The specific upload instructions may depend upon the media site identity, the user identity, instruction from the media site, and/or instruction from the user, any or all of which may be provided through the instruction/key request 702 or otherwise from the user's computer 20, media site 30, or otherwise. The upload instructions and key 703 are sent to the user's computer 20 and a confirmation 704 (including the generated key) is sent to the media site 30 confirming that the key and instructions were provided. At the user's computer, the received upload instructions and key 703 are used to encode, encrypt, and upload the encrypted/encoded content 705 to the media site 30.

Figure 8:
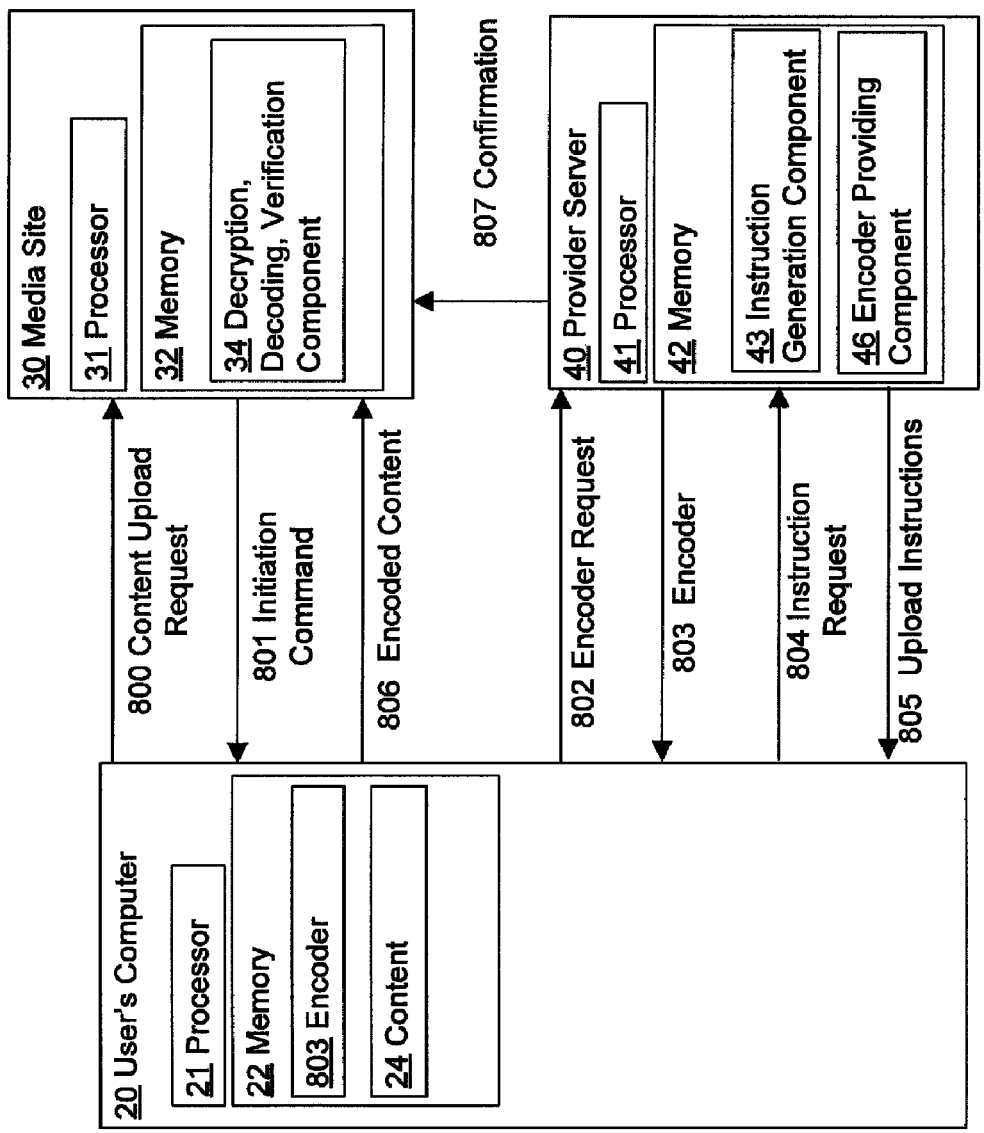
FIG. 8 is a flow chart illustrating exemplary communications resulting in a user computer sending encrypted content to a media site according to an encoder, instructions, and a key provided from a provider server.

FIG. 8 is a flow chart illustrating exemplary communications resulting in a user computer 20 sending encrypted content to a media site 30 according to an encoder, instructions, and a key provided from a provider server 40. In this example, a user initiates this process by sending a content upload request 800 to the media site 30. In response, the media site 30 sends an initiation command 801 back to the user's computer 20. In response to the initiation command 801, the user's computer, which does not already have the necessary encoder, attempts to retrieve the encoder by sending encoder request 802 to a provider server 40. The encoder providing component 46 of the provider server 40 replies by sending the encoder 803 back to the user's computer 20, where it is available for use with respect to the current, and in some embodiments, future content uploading.

In addition to requesting an encoder, the user's computer also, simultaneously or separately, sends an instruction request 804 based on the initiation command 801. The instruction generation component 43 of the provider server responds by sending upload instructions back to the user's computer for use in uploading the current, and in some embodiments future, uploads to the media site.

After receiving the encoder 803 and instructions 805, the user's computer 20 can use the encoder 803 to encode the content 24 in accordance with the instructions 805. The encoded content 806 is then sent to the media site for distribution or other use. While FIG. 8 does not show encryption of such encoded contents 806, it should be understood, that various encryption features of other embodiments can be incorporated in this context as well. For example, the encoded content 806 may be encrypted on the user's computer 20 using a key provided by created and/or provided by the media site 30 and/or the provider server 40.

In some embodiments, an encoder 803 is provided as a component or plug in that works within an existing application on the user's computer. For example, an encoder may be provided as a plug in to a content viewing component. As a specific example, an encoder may be provided for an Adobe® FlashPlayer® application for encoding content that is viewable on that application. The recipient application can ensure its integrity by only accepting plug ins or other components from trusted sources. For example, an Adobe® FlashPlayer® application may only accept encoders, instructions, keys, profiles, or other information used to encode or encrypt content from an Adobe® controlled or endorsed provider server.

A user need not be aware that an encoder is added. Nor does a user necessarily need to be aware of instructions or profiles that are received for uploading. Generally, in certain embodiments, provision of encoders, upload, instructions, keys, profiles and other information takes place in the background of the user controlled upload.

An encoder may have applicability to multiple upload recipients, such as, for example, multiple social media sites. Thus, once an encoder has been added to a user's computer, it can be reused in multiple contexts. Similarly, once information used to encode or encrypt content according to a particular site's upload parameters is retrieved at a user's computer, such information can be stored and made available for future uploads to that site when the same parameters are called identified by an initiation command.

For example, an initiation command may specify that encoder A1 and upload profile B1 should be used for a given upload to a particular media site C1. If the encoder A1 or the profile B1 are already present on the user's computer, then these items need not be retrieved from another location. If the encoder is not already present on the user's computer it can be retrieved and stored for future use. For example, if, for subsequent upload, an initiation command specifies that encoder A1 and upload profile B2 should be used for an upload to the same media site C1, then the same encoder can be reused and the other profile, in this case B2, used. If, for yet another subsequent upload, another initiation command also specifies that encoder A1 and upload profile B2 should be used for a given upload, those already present encoder A1 and profile B2 items can be used on the user's device to accomplish the upload.

Certain embodiments involve an upload recipient sending an initiation command or other triggering instructions to a user's computer. Such information may take the form of an upload profile including specific parameters by which the upload to the recipient should be encoded and/or encrypted. For example, the instructions may identify a specific FTP address and an associated password. The upload recipient may send or cause to be sent a key that can be used for encryption, authentication, or other security purposes. A key need not be a single number. A key could simply be the name or unique number that will be given to the file containing the uploaded content. The key could be used to encrypt the file. The key could simply be associated with the file as metadata.

Certain embodiments facilitate revenue sharing based on a third party acting as a provider of trusted encoders, upload instructions, and/or encryption key information. For example, an upload recipient can create a profile and provide it for distribution by a provider to requesting users. The upload recipient can initiate user access to the profile with a simple initiation command without itself having to monitor, control, or provide the profile. An initiation command can be sent with a profile number identifying the particular profile to be used. If the user's computer does not already have the profile, the profile is requested from the provider. This can improve security and increase both the upload recipient's and the provider's confidence with respect to the encoding and/or encryption that is occurring on the uploading user's machine. It can also facilitate auditing of the upload transaction for a variety of purposes and benefits.

Certain embodiments enable encoding and/or encrypting on a user's computer for in only limited circumstances. For example, an encoding component provided to a user's computer may be useable only with respect to upload to one or more particular media site that have reached a financial revenue sharing agreement with the encoding component provider.

Certain embodiments allow an upload recipient, such as a social media site, to control the encoding of the content that is uploaded without having to decode and re-encode the content. Various encoding and encrypting functions can be handled on the user's computer under the control of the media site and/or a trusted provider. In some embodiments, an upload recipient is able to avoid the reduction in quality that associated with its upload decode/re-encode processes that might otherwise be used. A user's machine may be able to encode an original source file, further minimizing any reduction in quality that might otherwise occur during a decode/re-encode process at the server.

An encoder and/or an encryption component may be separate from one another an other application on a user's computer. In other cases, these components may be combined with one another and/or one or more existing applications on a user's computer. In certain embodiments, the encoder and encryption component are invisible to the uploading user.

Certain embodiments provide encoding and encrypting components that are used directly by a user. For example, a user may create their own profile for uploading to their own website of for encoding and storing content on their own local computers. In some of these embodiments, such a profile is maintained by a provider. A provider may also offer generic profiles for use by users. A user may be able to select a profile using a web interface for a current encoding or encrypting task. The interface may provide different available profiles offering different quality, advantages, compression, and other attributes.

In certain embodiments, one or more of the communications amongst a media site, user's computer, and provider site are encrypted to improve the security and integrity of the system. For example, all instructions for using and/or retrieving a specific encoder, parameters, profile, or other instructions can be encrypted such that these items can only be interpreted by a trusted application. The application can recognize and accept only those instructions that are in accordance with its defined security measures, ensuring that encoding and encrypting functionalities are not misused.

In certain embodiments, upload instructions specify various parameters for encrypting content. In some cases, the upload instructions further specify advertisements, overlays, metadata, and other content and information that will be inserted as part of the content during the encoding, encrypting, uploading, or otherwise. An upload profile, for example, may have metadata information to insert into the encoded video and instruction regarding how that metadata should be inserted. Certain embodiments provide a tiered method of providing encoding/encrypting functionality in which a user is able to use an encoder/encrypting component for free or for a reduced rate in a mode in which a profile specifies that advertisements are inserted into the content.

Certain embodiments also facilitate the uploading of live video. For example, a profile could be created for live video. One such exemplary profile instructs a user's computer to turn on its webcam, use a specific encoder technology, and provide instructions for handling all of the work that a user might otherwise have to do in setting up live video upload, including but not limited to, specifying buffering, handling, and error checking. The profile, for example, may specify recording video in 4 second segments that are then individually encoded for upload to a recipient. The use of such a profile may simplify the user's configuration and allow for upgraded encoding capability. Embodiments that involve capturing live video and encoding it in real-time may involve a server providing an encoding token directly to a client-side encoder and then tracking the stream.

Certain embodiments provide security to an uploading user by allowing the user to ensure that encoding and encrypting components and instructions will only come from trusted sources. For example, a media player application may be configured to perform encoding and encrypting only based on instructions/profiles from a source trusted by the application. They may trust a media player application provider more than a previously unknown website to which the user wants to upload content. To further this trust, an application used to carry out encode and/or encrypt functions may be configured to receive instructions only from a trusted source such as from an Internet source maintained by the application provider itself. In some embodiments, a profile's contents may be accessed by only a trusted application, and in only limited ways, such that sensitive information relating to file naming, wrapping, encryptions, metadata, encoding, and uploading, among other things, can be hidden from general public access.

Certain embodiments provide security using a transaction ID that is sent from an upload recipient to the uploader. The transaction ID is used by a trusted application on the uploader's computer to access all of the applications and/or information needed to encode and/or encrypt content appropriately. All of the applications and/or information needed to encode and/or encrypt content may be retrieved from a trusted source allowing both the upload user and the upload recipient to proceed with the transaction without having to trust the other party. Both parties can trust the provider to ensure the encoding is appropriate.

Certain embodiments facilitate distribution of encoding and encryption components and information through a link to an application on a user's computer. An application provider may provide an exclusive, cryptographically secure communication channel with its applications to transport encryption info. This channel can provide a convenient mechanism for implementing various aspects of the communication between a provider and a user's computer. For example, the channel can be used to send code to implement a plug-in within an application on the user's computer.

The term "encryption" as used herein refers broadly to any technique for transforming information or other content to make it unreadable to anyone except those possessing special knowledge. A key can be used to facilitate such encryption. Encryption may involve the use of a cipher. Certain embodiments use a key in other ways. For example, a key may simply be hashed with the content so that the recipient can verify that the sender possessed the key.

In certain embodiments, a media site sends an instance ID to a provider that the provider uses to generate a new number. For example, the new number may be created by combining the instance ID with a provider generated number. The numbers may be hashed or otherwise combined. The created number may also include a number specific to the particular user that is involved in the upload transaction. However created, the number can be sent to the user for encoding and to the media site for decoding. These embodiments provide an additional mechanism for a third party to control the client-side encoding of content such that both the client and recipient can trust the encoding is appropriate.

While certain embodiments utilize a provider to facilitate the encoding and/or encryption of content by a user's computer, some embodiments do not include a provider. For example, certain embodiments allow an upload recipient such as a media site to provide the necessary encoding/encrypting components and parameters to authenticate proper encoding and encryption.

Figure 9:
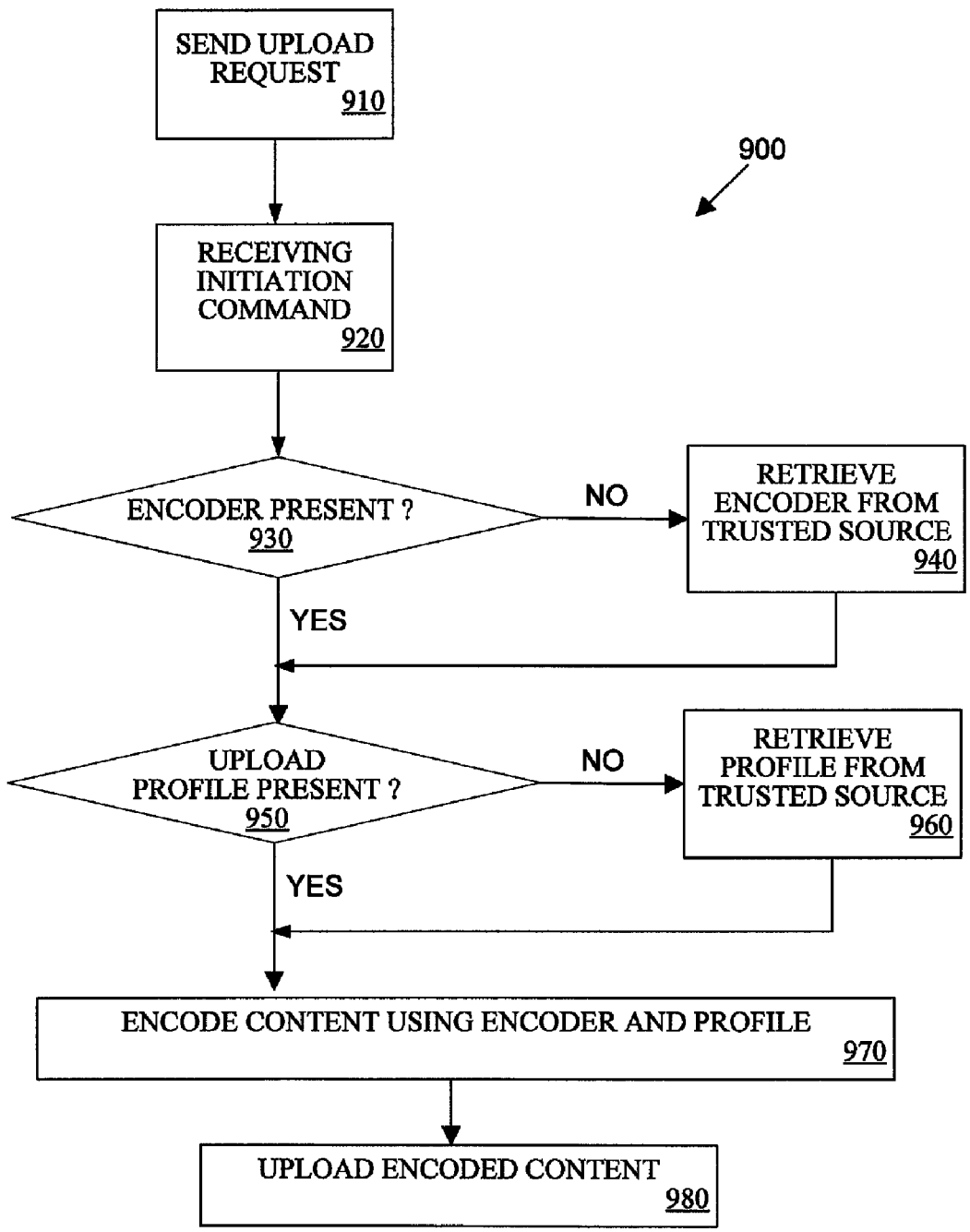
FIG. 9 is a flow chart illustrating an exemplary method of uploading content from the perspective of the uploading computing device, according to certain embodiments.

FIG. 9 illustrates an exemplary method 900 of uploading content from the perspective of the uploading device. In this embodiment a user's computer sends an upload request, as shown in block 910. The upload request may be sent to or may otherwise identify an upload recipient to receive content that will be uploaded from the user's computer.

The user's computer next receives an initiation command, as shown in block 920. Such a command may be a computer-generated response to the upload request. As described with respect to various exemplary embodiments herein, the initiation command may provide various instructions and/or other information that the user's computer uses to accomplish the upload of the content to the recipient. An initiation command may provide a simple upload identifier in some cases. In other cases, an upload command will identify a specific encoder, upload profile, instructions, and/or other information for the upload. The initiation command, in some cases, need not comprise any information. For example, the user's computer may have provided a unique transaction number in the upload request and the initiation command may simply return that number to the user's computer to indicate that the upload can proceed. A variety of additional alternatives are of course possible depending on the particular system requirements and other circumstances.

The method 900 further involves determining whether the needed encoder is present on the user's computer, as shown in block 930. If the encoder is not present, the method 900 retrieves the encoder from a trusted source, as shown in block 940. For example, the encoder may be retrieved from the upload recipient in some cases. In other cases, an encoder may be retrieved from a trusted Internet location.

Once an encoder is present on the user's computer, the method 900 determines whether an upload profile to be used for the upload is present on the user's computer, as shown in block 950. Such an upload profile may comprise a variety of types of information useful in specifying the parameters and/or other aspects of the upload. The profile may have been specified or defined by the upload recipient and made available from the upload recipient and/or a trusted third party. If the profile is not present on the user's computer, the method 900 retrieves the profile from a trusted source, as shown in block 960.

The retrieval of an encoder and profile can be combined in a single step in some embodiments. In some embodiments, the encoder and/or profile are identified in the initiation command. In some embodiments, the trusted source is identified in the initiation command. In certain embodiments, the user's device uses information in the initiation command to identify an encoder, profile, trusted source, and/or other information by accessing other information made available by another party. In certain embodiments, the initiation command is encrypted. The user's computer can, in some such cases, decrypt the initiation command and encrypt additional communications related to the upload in a similar or different manner. In some embodiments, a key for use in encryption is provided with the initial command or otherwise made available to the user's computer.

Returning to FIG. 9, once the encoder and profile are present on the user's computer, the method 900 proceeds to encode the content using the encoder and profile, as shown in block 970. Finally, the encoded content is uploaded to the upload recipient, as shown in block 980. The encoded content may or may not also be encrypted. Generally, the encrypted content will indicate or provide an indication that it was encoded appropriately so that the upload recipient can trust that the content was encoded appropriately.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

Certain embodiments provide techniques for facilitating the client-side encoding of content. These embodiments are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, JavaScript, ActionScript, MXML, and CSS.

While the network shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

What is claimed is:

1. A method comprising:
sending a request to upload content to a recipient;
in response to the request, receiving instructions for encoding the content according to encoding requirements of the recipient, receiving a key with the instructions for encoding the content;
encoding the content to create encoded content in accordance with the instructions for encoding the content and using the key to provide an indication that the content was encoded in accordance with the instructions for encoding the content, wherein the encoded content provides the indication that the content was encoded in accordance with the instructions for encoding the content; and
uploading the encoded content to the recipient.

2. The method of claim 1 further comprising encrypting the encoded content prior to uploading the encoded content to the recipient.

3. The method of claim 1, wherein the instructions for encoding the content are received from a source, the source different from the recipient of the encoded content.

4. The method of claim 1, wherein the instructions for encoding the content are received from the recipient.

5. The method of claim 1 further comprising determining whether an encoder required by the instructions for encoding content is present and, if the encoder is not present, receiving the encoder.

6. The method of claim 5, wherein the encoder is received from a source other than the recipient of the encoded content.

7. The method of claim 5, wherein the encoder is a component that enhances an application by adding encoding capability to the application.

8. The method of claim 5, wherein the encoder is limited to encoding content for upload to a particular media site recipient.

9. The method of claim 5, wherein, after uploading the encoded content, the encoder is available for subsequent use.

10. The method of claim 5, wherein the encoder is deleted after encoding the content so that the encoder is not available for subsequent use.

11. The method of claim 1, wherein the instructions for encoding the content according to encoding requirements of the recipient comprise an upload profile specifying one or more compression parameters.

12. The method of claim 11 further comprising storing the upload profile for subsequent use.

13. The method of claim 1, wherein using the key to provide the indication comprises hashing the key and content together.

14. The method of claim 1 further comprising receiving an initiation command in response to the request to upload content to a recipient and, using information from the initiation command to request the instructions for encoding content.

15. The method of claim 1, further comprising receiving additional instructions for uploading the content with the instructions for encoding the content.

16. The method of claim 15, wherein the additional instructions specify a network location and password for uploading the encoded content.

17. A system comprising:
a processor configured to execute instructions stored in memory to perform steps comprising:
sending a request to upload content to a recipient;
in response to the request, receiving instructions for encoding the content according to encoding requirements of the recipient, receiving an identifier with the instructions for encoding the content;
encoding the content to create encoded content in accordance with the instructions for encoding the content, wherein inclusion of the identifier in the encoded content provides an indication that the content was encoded in accordance with the instructions for encoding the content; and
uploading the encoded content to the recipient.

18. A method comprising:
providing a profile to a provider for distribution to a computer device that has requested to upload content, wherein the instructions comprise the identifier and specify that the content be encoded with the identifier;
providing instructions to the computer device to retrieve the profile from the provider and use the profile to encode the content to create encoded content, inclusion of the identifier in the encoded content indicating that the encoded content was encoded according to the profile;
receiving an upload of the encoded content from the computer device; and
determining whether the encoded content was encoded according to the profile.

19. A non-transitory computer-readable medium on which is encoded program code, the program code comprising:
program code for sending a request to upload content to a recipient;
program code for receiving instructions for encoding the content according to encoding requirements of the recipient, the receiving comprising receiving an identifier with the instructions for encoding the content;
program code for encoding the content to create encoded content in accordance with the instructions for encoding the content, wherein inclusion of the identifier in the encoded content provides an indication that the content was encoded in accordance with the instructions for encoding the content; and
program code for uploading the encoded content to the recipient.

20. A method comprising:
executing instructions on a computing platform so that binary digital electronic signals are received representing instructions for encoding content according to encoding requirements of a recipient, wherein an identifier is received with the instructions for encoding the content;
executing instructions on the computing platform so that the content is encoded to create encoded content in accordance with the instructions for encoding the content, wherein inclusion of the identifier in the encoded content provides an indication that the content was encoded in accordance with the instructions for encoding the content; and
executing instructions on the computing platform so that the encoded content is uploaded to the recipient.

* * * * *